No. 616,650. Patented Dec. 27, 1898.
J. W. BEARD.
VEHICLE WHEEL HUB.
(Application filed June 30, 1898.)
(No Model.)
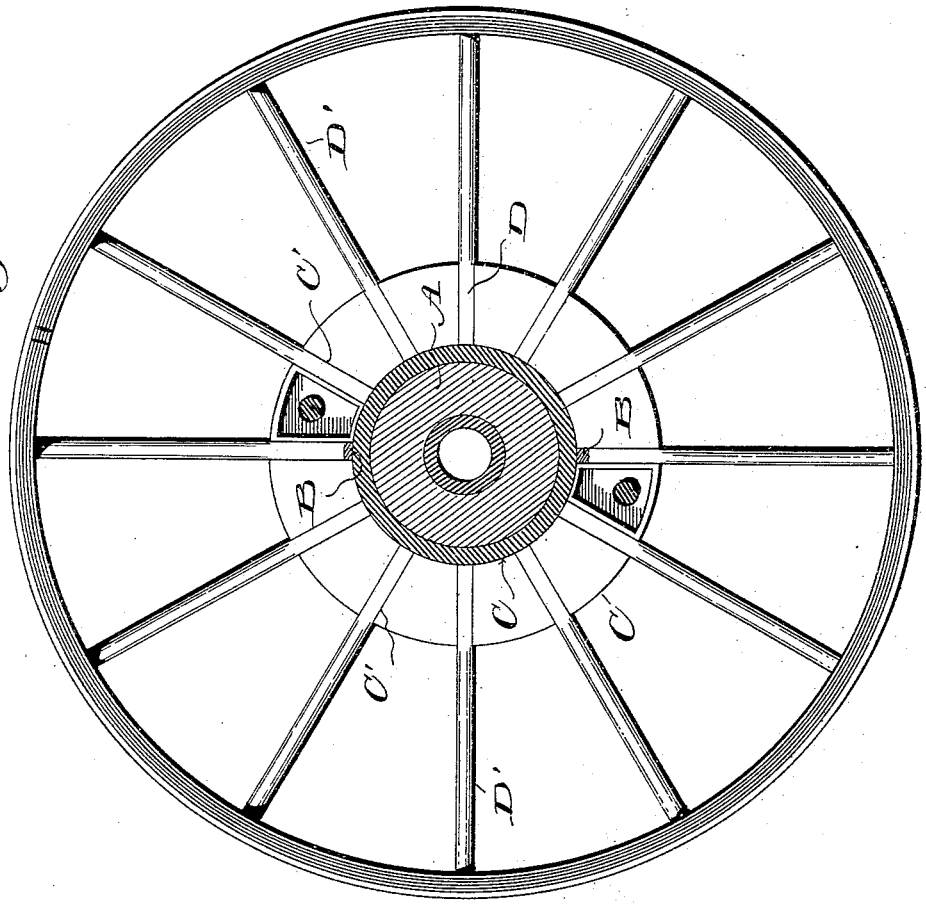
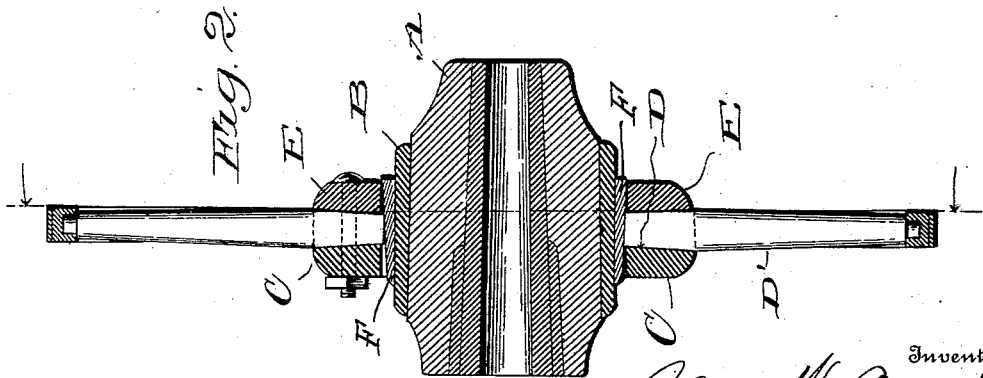

UNITED STATES PATENT OFFICE.

JAMES W. BEARD, OF BIENVILLE, LOUISIANA.

VEHICLE-WHEEL HUB.

SPECIFICATION forming part of Letters Patent No. 616,650, dated December 27, 1898.

Application filed June 30, 1898. Serial No. 684,849. (No model.)

*To all whom it may concern:*

Be it known that I, JAMES W. BEARD, a citizen of the United States, residing at Bienville, in the parish of Bienville and State of Louisiana, have invented certain new and useful Improvements in Vehicle-Wheel-Hub Attachments; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in vehicle-wheel attachments, and especially to the provision of means whereby spokes may be easily and quickly replaced and tires tightened and attached to flanges which are carried by a cylinder and are clamped securely together.

The essential object of the invention resides in the provision of means whereby old, worn, and discarded vehicle-wheels may be readily repaired and made serviceable.

The present invention consists in the novel construction, combination, and adaptation of the parts, as will be hereinafter more fully described and then specifically defined in the appended claim.

The invention is clearly illustrated in the accompanying drawings, which, with the letters of reference marked thereon, form a part of this application, and in which—

Figure 1 is a central vertical section through the wheel at right angles to the length of the hub. Fig. 2 is a section vertically and longitudinally through the hub and wheel.

Reference now being had to the details of the drawings by letter, A designates an ordinary hub, which is made solid with the exception of the central longitudinal bore therein. Over said hub is fitted the slightly-tapering cylinder B, the hub first being tapered so as to fit snugly within the cylinder. To the circumference of said cylinder is fastened the flange C, having on its inner face a series of radiating slots C', in which the butt-ends D of the spokes D' engage, as shown.

E is a second flange or plate, which is designed to clamp over the outer edges of the spokes and to be held flat against the edges of the spokes and the solid portions of the flange C between the spokes. This flange E is held to flange C by means of bolts passing through the solid portions between the spokes, the heads of the bolts being preferably countersunk in the face of the flange. In making the said flanges they are properly dished so that the wheel will always be caused to work truly. In order to tighten the spokes as they may chance to become loose, it is my purpose to drive a wedge F between the inner end of the spoke and the said cylinder. By this means the spokes may be kept tight and the tire also by slightly driving the spokes outward. When for any purpose it is desired to replace a spoke, the flange E may be removed by simply taking out the retaining-bolts, after which the flange may be secured in place by the bolts.

In applying the cylinder, on which the flanges and spokes are carried, to the hub it is my purpose to expand the cylinder by heating it and then shrinking it over the hub, which latter has first been shaped to receive the cylinder.

By my invention I produce means whereby either old or new hubs may be employed, and any person without being skilled in the art of wagon-making can easily repair a wheel, replace spokes, and adjust the cylinder to a hub.

The use of the tapering cylinder B, it will be observed, constitutes one of the most essential elements of the invention, as it is at once evident that any old or worn vehicle-hub can be readily finished upon the outside and beveled to receive the cylinder, which cylinder forms the basis upon which the flange-plates retaining the wheel-spokes are secured.

Having thus described my invention, what I claim to be new, and desire to secure by Letters Patent, is—

The combination with a tapered hub having a smooth outer surface, of a tapered cylinder fitted over the hub and having a flange with radial slots, spokes having their inner ends received in said slots, a plate removably fitted over the outer faces of the spokes and bearing against the other flange between the spokes, bolts passed through the two flanges between the spokes and wedges driven in between the outer face of the cylinder and the inner ends of the said spokes, and passed through openings in the said flange and plate, whereby the spokes may be tightened without removal of said plate, all substantially as herein shown and described and for the purpose specified.

In testimony whereof I affix my signature in presence of two witnesses.

JAMES W. BEARD.

Witnesses:
　J. D. HEAD,
　T. J. WEBB.